F. P. MARTIN.
APPARATUS FOR DELIVERING MATERIALS.
APPLICATION FILED MAR. 28, 1919.
1,393,561.
Patented Oct. 11, 1921.
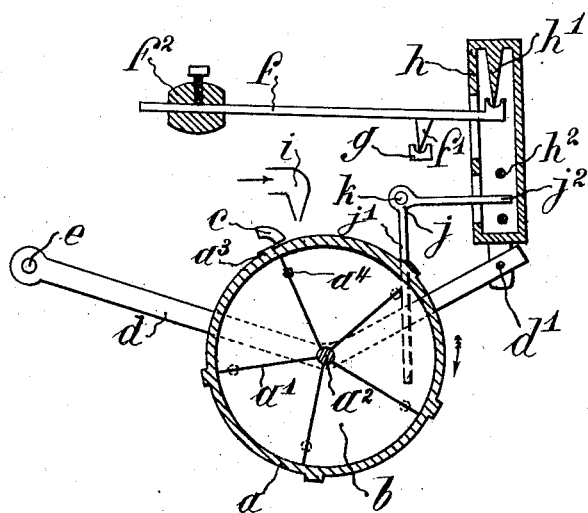
Witnesses:
Inventor
Fernand P. Martin
by
Attorney

UNITED STATES PATENT OFFICE.

FERNAND PAUL MARTIN, OF PARIS, FRANCE.

APPARATUS FOR DELIVERING MATERIALS.

1,393,561.  Specification of Letters Patent.  Patented Oct. 11, 1921.

Application filed March 28, 1919. Serial No. 285,836.

*To all whom it may concern:*

Be it known that I, FERNAND PAUL MARTIN, engineer, citizen of the French Republic, residing at Paris, France, have invented certain new and useful Improvements in Apparatus for Delivering Materials, of which the following is a specification.

The invention relates to apparatus which are designed to deliver materials in fractions of equal weights, such as meters, and has for its object to build apparatus of this kind in a simpler and more accurate manner than hitherto.

The invention comprises a drum divided by partitions into compartments occupying equal sectors of the said drum, the said drum being suspended to an oscillating system arranged so that it allows the drum to be locked in its position of rest when it is empty, and that it balances the latter when a given quantity of material has been introduced into one of its compartments, whereby if an additional quantity of material is introduced into the said compartment, the said drum moves, discharges its contents and acts through a suitable device on the oscillating system so as to return the said drum to its position of rest.

The invention further comprises other arrangements, more explicitly referred to hereinafter and claimed in the claims.

The single figure of the said drawing shows diagrammatically in vertical section an apparatus according to the invention.

The invention will be described as applied to a water meter having a drum $a$ constituted by two opposite faces connected together by radial metal sheets $a^1$ forming a number of compartments or buckets $b$ preferably of the same dimensions and arranged in sectors uniformly about the horizontal spindle $a^2$ of the drum.

The drum $a$ is provided on its circumference with a number of projections or teeth $a^3$ equal to the number of buckets $b$ arranged at regular intervals, and also with the same number of tenons $a^4$ arranged at regular distances and all radially equidistant from the spindle $a^2$. At a fixed point is arranged a part $c$ which forms a stop for any of the teeth $a^3$, when the drum $a$ rotates in the direction of the arrow. The position of the drum when stopped is that in which a vertical plane passing through the spindle $a^2$, intersects one of the buckets which is above the said spindle, so as to divide the said bucket into two portions of slightly different volume, the greater portion being at the side of the direction of rotation indicated by the arrow.

The spindle $a^2$ of the drum is rotatably supported between the two ends of a lever $d$. The said lever is pivoted to a fixed horizontal spindle $e$ at one of its ends, and so that when the lever $d$ makes a suitable oscillation about the point $e$ and the drum $a$ makes an also suitable rotation about its spindle $a^2$, any one of the teeth $a^3$ can strike the part $c$ and prevent the drum from rotating. Any means for balancing the movable system may be used, assuming that one bucket contains a given quantity of water, so that the least additional quantity of water introduced into the said bucket, tips the system.

A suitable weight is arranged to act on the lever $d$, so that the latter raises the drum and presses one of its teeth $a^3$ against the stop $c$. To this end a lever $f$ is provided between its ends with a knife edge $f^1$ which is supported on a fixed support $g'$ thereby being fulcrumed at that point. One of the ends of the said lever is provided with a balance weight $f^2$ (which is preferably arranged so that it can be moved on the lever), and the other end of the lever $f$ is connected to the end of the lever $d$, which is opposite to the pivot $e$, by means of a part $h$ which is supported by a knife edge $h^1$ on the lever $f$, and is also pivoted at $d^1$ to the lever $d$.

The apparatus being in the position of rest, that is, with one of its teeth $a^3$ engaging with the part $c$ and the upper bucket being in the position already mentioned, if water is introduced into the said bucket, for instance through a nozzle $i$—which in the neighborhood of the upper part of the partition corresponding to the portion of smaller volume of the said bucket—the system will first be in equilibrium, and then the said equilibrium will be disturbed. The drum then descends owing to its weight, disengaging the tooth $a^3$ and turning about the joint $e$ of the lever $d$, and at the same time begins to rotate in discharging its contents, while the next bucket begins to receive water. Then the balance weight raises the lever $d$, after the contents of the first bucket are discharged through the medium of lever $f$ and connection $h$, carrying with it the drum which returns to its position of rest, the next tooth $a^3$ sriking the part $c$. The second bucket is then held in position until the weight of the water introduced into it produces a fresh movement insuring its discharge. The apparatus is adjusted, so that the return to raised position is initiated and assisted by one of the tenons $a^4$ acting on one of the arms $j^1$ of a bell-crank lever $j$ pivoted about a spindle $k$ parallel to the spindle $a^2$, so that the other arm $j^2$ raises at the desired moment the joint $d^1$ of the lever $d$, which acts on the part $h$ through the intermediary of a projection $h^2$ provided on the said part, thus holding the drum in locked position until a sufficient amount of material has been discharged from the drum to permit weight $f^2$ to retain the drum in its elevated and locked position. The said tenon ceases to engage with the arm $j^1$ at a moment suitably determined, in order that the drum returns in the desired time to its position of rest, at the same time as the lever $j$.

By the movement of rotation of the drum $a$ a counter or meter of any desired type can be operated to indicate the number of discharges of buckets, and therefore, knowing the volume of water that a bucket holds, the total volume and weight of the water delivered during the course of the operation will be known.

The meter, as well as, if desired, a recording instrument with diagrams, can be operated direct in any desired manner by means for instance of a guided rod driven by one on the movable parts of the apparatus; and, for instance, by the arm $j^2$ of the lever $j$, the said rod being provided with a tappet which acts, at each discharge of a bucket, on the driving finger on the meter and on a pivoted pen intended to draw diagrams on the drum of the recorder.

The meter and the recorder may also be operated indirectly and from a distance, in also any suitable manner, for instance by means of a suitable fluid, a pneumatic system, or an electric system.

Obviously the parts of the apparatus described and shown in the diagram can be mounted on a single frame and the apparatus can be advantageously inclosed in a closed casing provided with a water inlet and outlet.

The apparatus described can be utilized not only as a fluid meter but also for automatically weighing solid materials in powder, grains or fragments. The distributer for the introduction of the said materials into the apparatus is arranged to suit the nature of material to be treated and to obtain a good distribution in the buckets. The said distributer is of course arranged so that it works only under the action of the weight of the material.

This apparatus moreover can have numerous applications. It can be used for mixing various materials. Its movements can be utilized either for direct control, or for control by a servo-motor, or for tele-control of valves or devices for closing and opening pipes of the distributer or any other pipes, as well as for starting, stopping, or regulating motors, pumps or other devices.

Obviously the invention is not limited to the construction described, but comprises any modifications within the scope of the claims.

Having now particularly described and ascertained the nature of my said invention and in what manner the same is to be performed, I declare that what I claim is:—

1. In an apparatus for delivering material in measured quantities, a lever adapted to oscillate about a fixed pivot, a measuring drum pivoted to said lever and comprising a plurality of compartments for the material to be measured, means for supplying the material to said compartments, lugs formed on the periphery of said drum, a fixed pawl adapted to engage said lugs, a lever pivoted above said drum having a weight slidably mounted thereon, a link connecting said levers, said drum being adapted to move out of contact with said pawl as the material in one of said compartments overbalances said weight, and means for initiating the return of said lever and drum to rest position after the contents of one of said compartments has been discharged.

2. An apparatus for delivering materials in measured quantities comprising a lever adapted to oscillate about a fixed pivot, a measuring drum pivotally secured to said lever, said drum having a plurality of compartments for the material to be measured, lugs formed on the periphery of said drum, projecting tenons from the side faces of said drum, a lever pivoted above said drum and having mounted thereon a weight, a link connecting said levers, and a crank arm positioned on a fixed pivot adjacent said drum and adapted to be oscillated by said tenons as the drum is rotated.

3. In an apparatus for delivering materials in measured quantities, a lever adapted to oscillate about a fixed pivot, a measuring drum pivotally mounted on said lever, means for normally locking said drum against rotation, said drum being moved out of engagement with said means by the downward movement of said lever whereby said drum is released and may rotate when a certain quantity of material has been placed therein, a weighted lever tending to return said first named lever to normal position, and means for initiating the return movement of said first named lever.

In testimony whereof I have hereunto set my hand in presence of two subscribing witnesses.

FERNAND PAUL MARTIN.

Witnesses:
 S. WILLIS,
 JOHN F. SIMONS.